United States Patent
Wagner et al.

(10) Patent No.: US 9,888,542 B1
(45) Date of Patent: Feb. 6, 2018

(54) OUTDOOR LIGHTING SYSTEM CONTROLLED USING MOTION SENSOR INTERFACE

(71) Applicant: ABL IP Holding LLC, Decatur, GA (US)

(72) Inventors: Phillip Ryan Wagner, Baltimore, OH (US); Robert Burt, Columbus, OH (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 15/581,427

(22) Filed: Apr. 28, 2017

(51) Int. Cl.
  *H05B 33/08* (2006.01)
  *H05B 37/02* (2006.01)

(52) U.S. Cl.
  CPC ....... *H05B 33/0854* (2013.01); *H05B 33/089* (2013.01); *H05B 37/0272* (2013.01)

(58) Field of Classification Search
  CPC .... H05B 37/02; H05B 37/0272; H05B 33/08; H05B 33/0821; H05B 33/0845; H05B 33/0854; H05B 33/089
  USPC ........ 315/151–158, 224–226, 291, 307, 308, 315/312
  See application file for complete search history.

(56) References Cited

U.S. PATENT DOCUMENTS

| | | |
|---|---|---|
| 2,924,806 A | 2/1960 | Hubbell et al. |
| 3,066,276 A | 11/1962 | Hubbell et al. |
| 3,083,347 A | 3/1963 | Fahey, Jr. |
| 3,112,973 A | 12/1963 | Von Holtz |
| 3,206,709 A | 9/1965 | De Vore, Jr. |
| 3,233,204 A | 2/1966 | De Vore, Jr. |
| 3,292,135 A | 12/1966 | Robinson |
| 3,339,171 A | 8/1967 | Carlson |
| 3,350,675 A | 10/1967 | Misencik et al. |
| 3,393,395 A | 7/1968 | Hubbell |
| 3,500,291 A | 3/1970 | Hubbell et al. |
| 3,601,660 A | 8/1971 | Brandt et al. |
| 3,945,702 A | 3/1976 | Poliak et al. |

(Continued)

OTHER PUBLICATIONS

Non-Final Office Action for U.S. Appl. No. 13/874,749, dated Oct. 27, 2014 (5 pages).

(Continued)

*Primary Examiner* — Jimmy Vu
(74) *Attorney, Agent, or Firm* — Kilpatrick Townsend & Stockton, LLP

(57) ABSTRACT

Aspects are provided for controlling outdoor lighting systems using a photocontrol interface that can be connected to a motion sensor and a luminaire driver or ballast. In some aspects, a dimming control node is electrically and communicatively coupled to a motion sensor via wired connections to a photocontrol interface. The dimming control node is also communicatively coupled to a luminaire ballast or driver. The dimming control node receives sensor data from the motion sensor via one of the wired connections and provides power to the motion sensor via another one of the wired connections. The dimming control node can determine a sensor output state of the motion sensor from the received sensor data, and can select a dim-level configuration corresponding to the determined sensor output state. The dimming control node can configure the luminaire ballast or driver in accordance with the selected dim-level configuration.

14 Claims, 5 Drawing Sheets

(56) References Cited

U.S. PATENT DOCUMENTS

| | | | |
|---|---|---|---|
| 3,949,211 | A | 4/1976 | Elms |
| 4,241,969 | A | 12/1980 | D'Amato et al. |
| 4,477,143 | A | 10/1984 | Taylor |
| 4,653,834 | A | 3/1987 | Norden |
| 4,695,769 | A | 9/1987 | Schweickardt |
| 4,726,780 | A | 2/1988 | Thackeray |
| 5,046,961 | A | 9/1991 | Hoffman |
| 5,450,302 | A | 9/1995 | Maase et al. |
| 5,593,318 | A | 1/1997 | Bilson et al. |
| 5,641,310 | A | 6/1997 | Tiberio, Jr. |
| 5,647,751 | A | 7/1997 | Shulman et al. |
| 5,680,926 | A | 10/1997 | Sandor et al. |
| 5,741,149 | A | 4/1998 | Anthony |
| 5,823,833 | A | 10/1998 | Castaldo |
| 6,328,581 | B1 | 12/2001 | Lee et al. |
| 7,011,552 | B2 | 3/2006 | Hoxha |
| 7,144,260 | B2 | 12/2006 | Murayama et al. |
| 7,307,514 | B2 | 12/2007 | McAden |
| 7,333,903 | B2 | 2/2008 | Walters et al. |
| 7,493,100 | B2 | 2/2009 | Welles, II et al. |
| 7,637,766 | B2 | 12/2009 | Kauffman et al. |
| 7,828,463 | B1 | 11/2010 | Willis |
| 8,038,481 | B1 | 10/2011 | Creighton et al. |
| 8,398,435 | B2 | 3/2013 | Aurongzeb et al. |
| 8,810,138 | B2 * | 8/2014 | Reed .................. H05B 37/0218 315/152 |
| 9,148,936 | B2 | 9/2015 | Wagner et al. |
| 2006/0068644 | A1 | 3/2006 | Zauber et al. |
| 2006/0292905 | A1 | 12/2006 | Gilliland |
| 2006/0292924 | A1 | 12/2006 | Spiri et al. |
| 2007/0149061 | A1 | 6/2007 | Oddsen et al. |
| 2008/0108252 | A1 | 5/2008 | Williams |
| 2009/0039799 | A1 | 2/2009 | Newman, Jr. et al. |
| 2009/0050785 | A1 | 2/2009 | Flaherty |
| 2009/0088021 | A1 | 4/2009 | Kauffman et al. |
| 2009/0215302 | A1 | 8/2009 | Roberts |
| 2010/0252715 | A1 | 10/2010 | Flaherty |
| 2010/0267268 | A1 | 10/2010 | Hering et al. |
| 2011/0028013 | A1 | 2/2011 | Kim |
| 2012/0086560 | A1 | 4/2012 | Ilyes et al. |
| 2012/0086561 | A1 | 4/2012 | Ilyes et al. |
| 2012/0139426 | A1 | 6/2012 | Ilyes et al. |
| 2012/0282815 | A1 | 11/2012 | Aurongzeb et al. |
| 2013/0044444 | A1 | 2/2013 | Creighton et al. |
| 2013/0280956 | A1 | 10/2013 | Cheng et al. |
| 2014/0162488 | A1 | 6/2014 | Staudigel et al. |
| 2016/0381768 | A1 * | 12/2016 | Noesner ............. H05B 37/0272 315/153 |

OTHER PUBLICATIONS

Response to Non-Final Office Action for U.S. Appl. No. 13/874,749, dated Apr. 24, 2015 (7 pages).

Notice of Allowance for U.S. Appl. No. 13/874,749, dated Jun. 2, 2015 (8 pages).

* cited by examiner

OUTDOOR LIGHTING SYSTEM CONTROLLED USING MOTION SENSOR INTERFACE

TECHNICAL FIELD

The present disclosure involves lighting control systems and more particularly relates to outdoor lighting systems that are controlled using a photocontrol interface for connecting to a motion sensor and a luminaire driver or ballast.

BACKGROUND

Control devices can be used to control operations of lighting devices and other lighting devices. For instance, control of outdoor lighting (e.g., street and area lighting) can include a timing mechanism disposed in a solid-state control device, known as a photocontrol. This control device can transmit control signals to the lighting device (or a lighting controller associated with the lighting device) that can cause the lighting device to change state (e.g., turn on, turn off, increase illumination, decrease illumination) in accordance with a schedule. Dimming street and area lights at times when there are no humans or vehicles in the area is a potential means of energy saving and also prolonging the life of lighting assets.

But existing control devices may present disadvantages for lighting systems that service outdoor environments having occasional traffic or other forms of occupancy during scheduled "off" or "low-illumination" periods. For example, streetlight photocontrols may lack the capability to dynamically adjust the controlled light level due to detected presence or lack of presence of humans in the area of interest.

SUMMARY

This disclosure involves outdoor lighting systems that are controlled using a photocontrol interface for connecting to a motion sensor and a luminaire driver or ballast. In some aspects, a dimming control node is electrically and communicatively coupled to a motion sensor via wired connections to a photocontrol interface. The dimming control node is also communicatively coupled to a luminaire ballast or driver. The dimming control node receives sensor data from the motion sensor via one of the wired connections and provides power to the motion sensor via another one of the wired connections. The dimming control node can determine a sensor output state of the motion sensor from the received sensor data, and can select a dim-level configuration corresponding to the determined sensor output state. The dimming control node can cause, via communications with the luminaire ballast or driver, the luminaire ballast or luminaire driver to be configured in accordance with the selected dim-level configuration.

DETAILED DESCRIPTION

Certain aspects involve outdoor lighting systems that are controlled using a photocontrol interface for connecting to a motion sensor and a luminaire driver or ballast. For example, a dimming control node in an outdoor lighting system can include (or be connected to) a photocontrol that couples the dimming control node to a motion sensor and a luminaire ballast or driver. The photocontrol can include a photocontrol interface with a three-blade interface in an industry standard pattern (such as one complying with the ANSI 136.10-2010 standard) as well as additional terminals that can be used for powering and communicating with other devices (e.g., the motion sensor) and for controlling other devices (e.g., the luminaire ballast or driver). For example, the photocontrol interface can include contact terminals through which sensor data can be received from a motion sensor and through which control signals can be transmitted to a luminaire ballast or driver.

Figure 1:
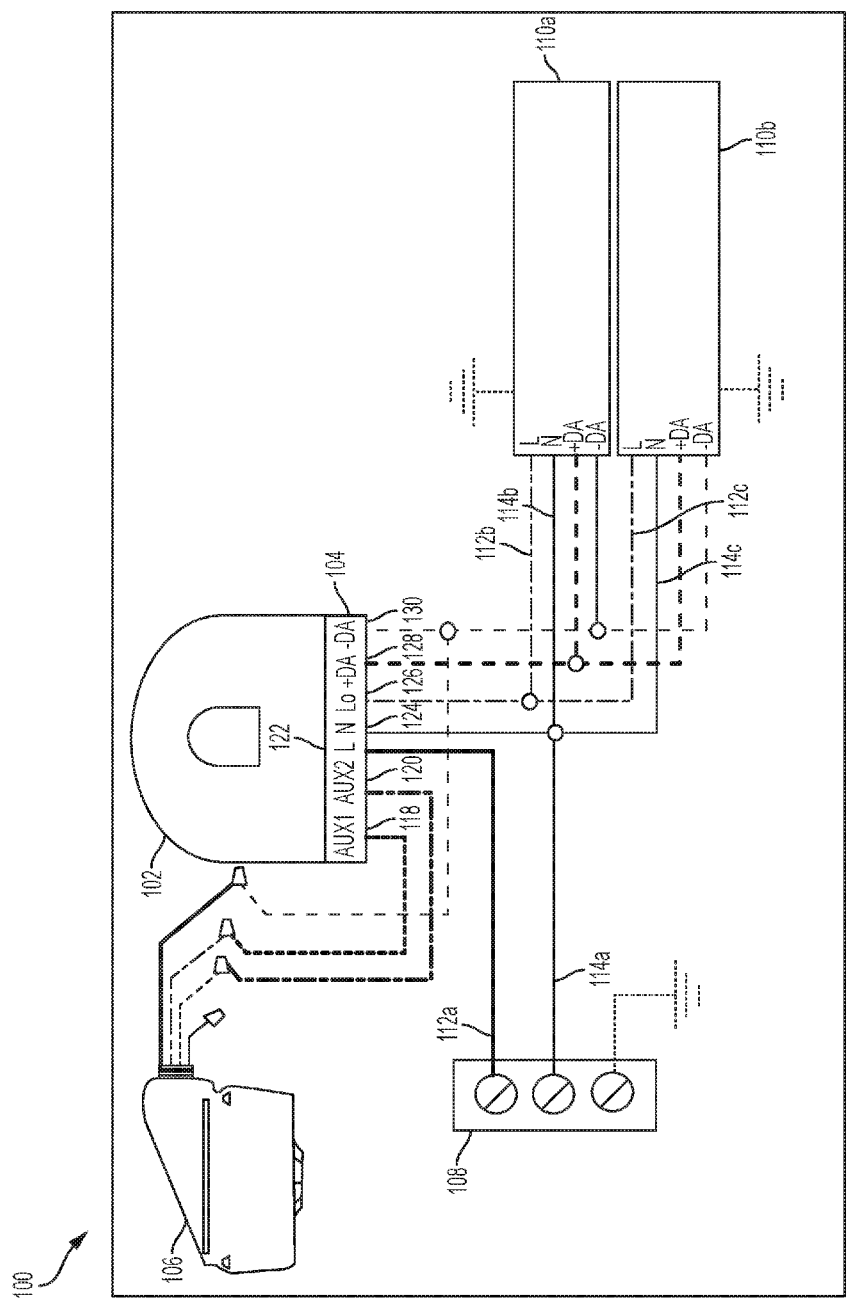
FIG. 1 is a diagram depicted an example of an outdoor lighting system controlled using a motion sensor interface to a motion sensor, according to some aspects of this disclosure.

FIG. 1 depicts an example of a motion-controlled lighting system 100. The motion-controlled lighting system 100 includes a dimming control node 102 having a photocontrol interface 104. In some aspects, the motion-controlled lighting system 100 is used to control one or more outdoor lighting fixtures (not shown). The outdoor lighting fixtures (e.g., luminaires) can be controlled using luminaire drivers or ballasts, such as the luminaire drivers 110a, 110b (e.g., electronic drivers for luminaires having light-emitting diodes).

The dimming control node 102 can be installed in any suitable manner (e.g., within a light fixture or on an exterior of the light fixture). The dimming control node 102 can be connected to other components through the photocontrol interface 104. In one example, the photocontrol interface 104 can be a multi-conductor photo control receptacle that complies with the ANSI C136.41 standard.

The photocontrol interface 104 includes multiple terminals that can provide one or more wired connections between the photocontrol interface 104 and a motion sensor 106, a luminaire terminal block 108, and luminaire drivers 110a, 110b. Communications via these connections allow the dimming control node 102 to use sensor outputs from the motion sensor 106 to control operation of a lighting control device via the luminaire drivers 110a, 110b or other lighting control device (e.g., a ballast). A luminaire driver or ballast can include one or more devices, components, or combinations thereof that can control the power provided to one or more lighting elements of a luminaire. A non-limiting example of a lighting element is a light-emitting diode or a group of light-emitting diodes.

In some aspects, using the wired connections depicted in FIG. 1 can avoid disadvantages associated with systems that use wireless interfaces to communicate with motion sensors. For example, the wired connections allow for a common point-of-interface between the dimming control node 102 and each of the motion sensor 106 and the luminaire drivers 110a, 110b. This reduces the need for additional wireless communication circuitry in the dimming control node 102 that would be used for communicating with the motion sensor 106. Furthermore, a wired connection may be less susceptible to noise or ambient radio-frequency ("RF") interference, which might trigger a false positive in wireless implementations (e.g., RF interference on a wireless interface to the dimming control node 102 being treated as a sensor output state indicating motion, even if no motion is present). Thus, the motion-controlled lighting system 100 can be effectively used in outdoor environments and other environments that are susceptible to RF interference or other electromagnetic interference that would disrupt operations of wireless motion sensors or other wireless communication devices.

Figure 2:
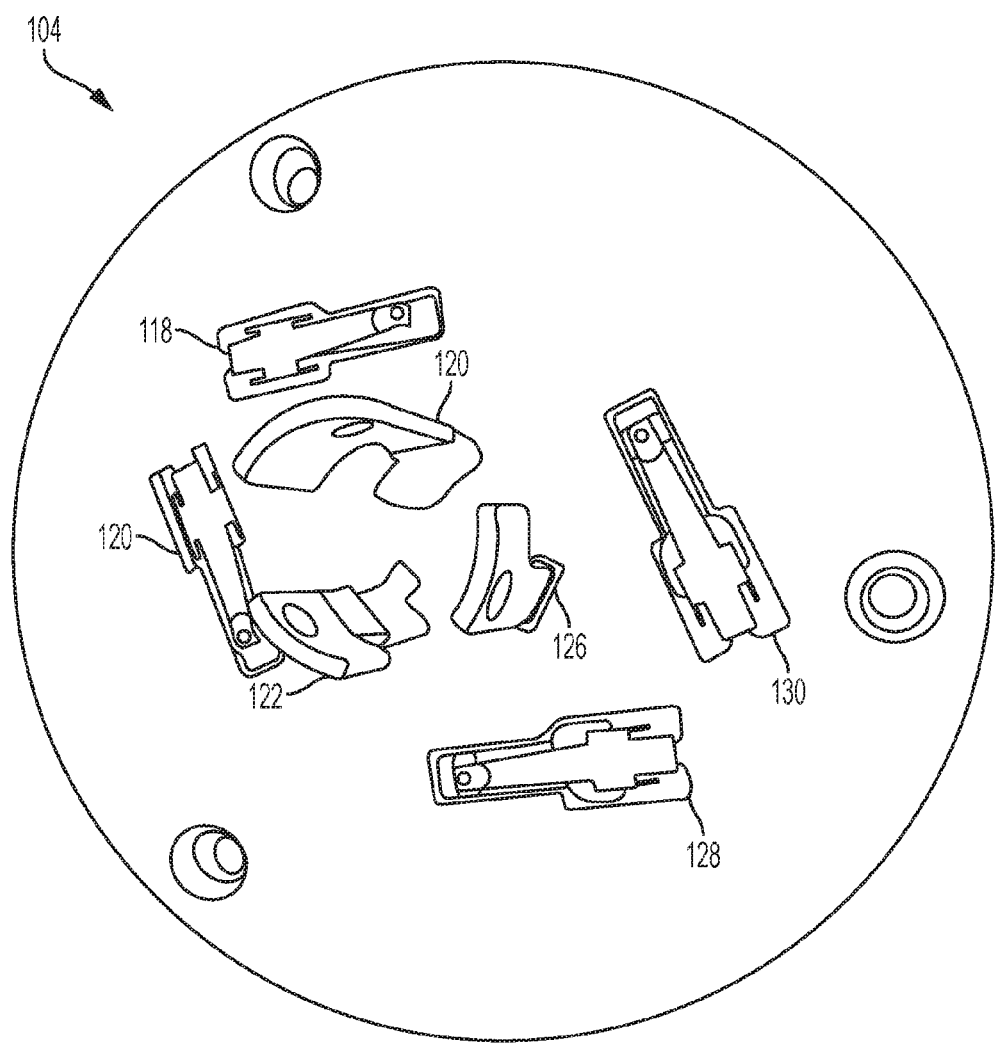
FIG. 2 is a perspective view of a photocontrol interface that communicatively couples a dimming control node to a motion sensor in the system of FIG. 1, according to some aspects of this disclosure.

In the example depicted in FIG. 1, the photocontrol interface 104 can be connected to the motion sensor 106 via a sensor power terminal 118 and a sensor input terminal 120. An example of the photocontrol interface 104 and examples of the sensor power terminal 118 and the sensor input terminal 120 are depicted in FIG. 2. Power can be provided to the motion sensor 106 via the sensor power terminal 118. In some aspects, the photocontrol interface 104 can also include a low-voltage common terminal that, in combination with the sensor power terminal 118, can be used to power the motion sensor 106. In one example, the dimming control node 102 can provide a 15 VDC power source to the motion sensor 106. The photocontrol interface 104 can also receive sensor output signals from the motion sensor 106 via the sensor input terminal 120. The photocontrol interface 104 can provide the received sensor output signals to one or more processing devices included in the dimming control node 102 or communicatively coupled to the dimming control node 102. In one example, the dimming control node 102 can receive, as an input, a low-voltage output from the motion sensor 106 that indicates that motion has occurred in the field of view of the motion sensor 106.

The photocontrol interface 104 can be connected to the luminaire terminal block 108 via a line terminal 122 and a neutral terminal 124, examples of which are depicted in FIG. 2. The line terminal 122 and the neutral terminal 124 can allow an electrical connection to be formed that provides power to the luminaire terminal block 108 via alternating current. For instance, in the example depicted in FIG. 1, a line connection 112a between the photocontrol interface 104 and the luminaire terminal block 108 can include a wired connection to the line terminal 122. A neutral connection 114a between the photocontrol interface 104 and the luminaire terminal block 108 can include a wired connection to the neutral terminal 124. (For illustrative purposes, different wired connections are depicted in FIG. 1 using different types of solid or dashed lines, such as a solid line for the line connection 112a, different dashed lines for different wired connections between the dimming control node 102 and the motion sensor 106, etc.)

The photocontrol interface 104 can be connected to the luminaire drivers 110a, 110b via a line terminal 126 and the neutral terminal 124. The line terminal 126 and the neutral terminal 124 can allow an electrical connection to be formed that provides power to a photocontrol (e.g., a luminaire ballast or luminaire driver) via alternating current. For instance, in the example depicted in FIG. 1, line connections 112b, 112c between the photocontrol interface 104 and the luminaire drivers 110a, 110b, respectively, can include wired connections to the line terminal 126. Neutral connections 114b, 114c between the photocontrol interface 104 and the luminaire drivers 110a, 110b, respectively, can include wired connections to the neutral terminal 124.

In some aspects, the photocontrol interface 104 can be connected to the luminaire drivers 110a, 110b via communication terminals 128, 130. The photocontrol interface 104 can communicate commands (e.g., dimming commands) to the luminaire drivers 110a, 110b via a communication interface provided by the communication terminals 128, 130.

In some aspects, at least two methods for providing dimming commands can be supported by the dimming control node 102 and the drivers 110a, 110b. The dimming methods include a 0-10 V analog dimming control (International Electrical Commission ("IEC") 60929 Annex E) and Digitally Addressable Lighting Interface ("DALI") (IEC 62386-20x) communications. DALI can be a 16 VDC system. Electrical conductors and contacts that are designed for 16 VDC at 250 mA can use both methods. Both DALI communications and 0-10 V analog dimming control can involve using two conductors for the physical layer (i.e., signal transmission medium) of the Open Systems Interconnection ("OSI") model.

In one example, luminaire drivers or ballasts can have a dimmable range between 1 and 5, and can be controlled by suitable control signals (e.g., 0-10 V analog, DALI signals, etc.). The luminaire drivers 110a, 110 can be installed in a manner in which they are supplied 120-480 VAC nominal through connections, which are all in phase, to a fixture system's neutral lead (e.g., a white-wire lead) and a photocontrol-switched line voltage lead (e.g., a red-wire lead).

In some aspects, the motion-controlled lighting system 100 may be included in (or be used to implement) a light management system in which intelligent luminaire managers are networked and provide for luminaire control and other functions. An example of a light management system in which certain aspects can be implemented is described in U.S. Pat. No. 7,333,903 to Walters, et al., titled "Light Management System Having Networked Intelligent Luminaire Managers with Enhanced Diagnostics Capabilities."

In some aspects, the dimming control node 102 can monitor and react to an output of the motion sensor 106 by adjusting the connected light fixture to a pre-determined dim level. For example, the dim level can be adjusted in response to initial signaling of motion detection and for a period defined by the length of the motion sensor output remaining in the active state. In some aspects, the dimming control node 102 can adjust the fixture's dim level regardless of other queued commands such as sniffer, scheduled operation, etc. In additional aspects, the sensor-triggered dim level is unable to override an auto-activation routine that takes control of the fixture upon initial registration for a short period.

Figure 3:
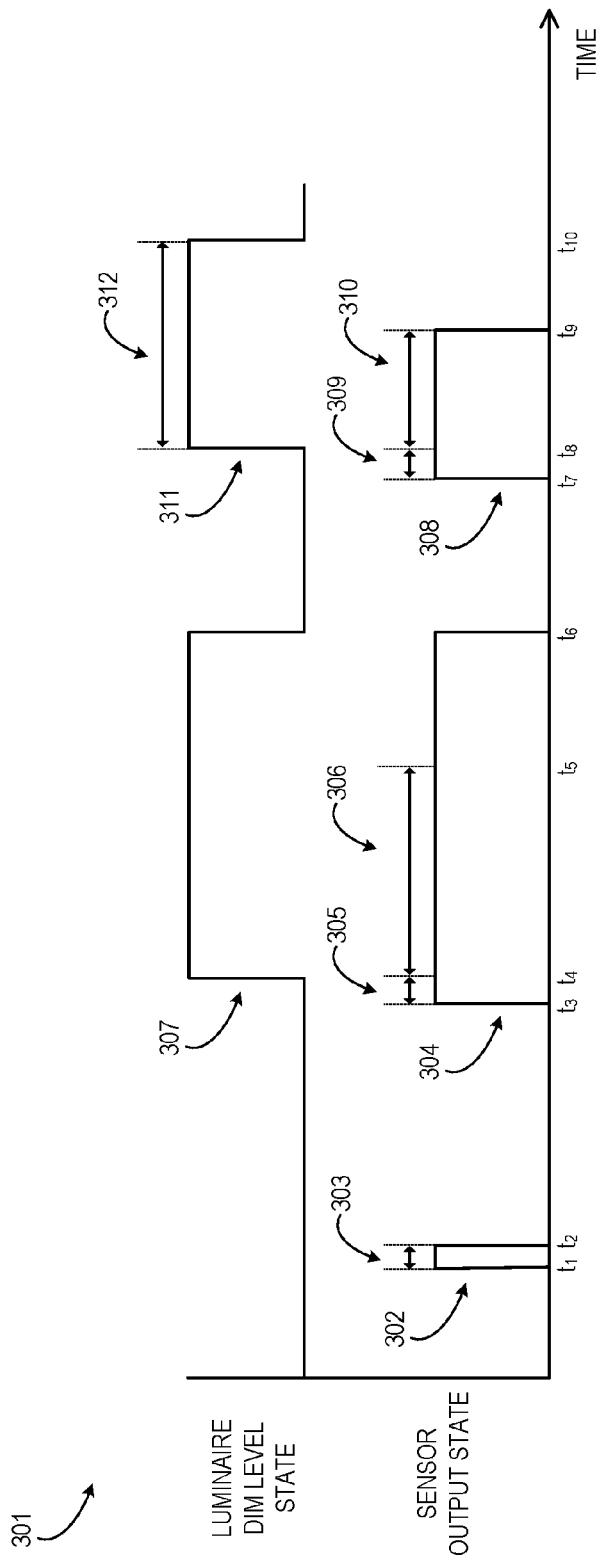
FIG. 3 is a timing diagram depicting relationships between motion sensor outputs and luminaire dim levels provided by the system of FIG. 1, according to some aspects of this disclosure.

FIG. 3 is a timing diagram 301 that depicts an example of changes in lighting levels controlled by the motion-controlled lighting system 100 using sensor outputs from the motion sensor 106. In this example, one or more processing devices, which can be included in or otherwise associated with the dimming control node 102, can determine one of the sensor output states 302, 304, or 308 from sensor data that is received from the motion sensor 106. The sensor data describing sensor output states 302, 304, and 308 is generated by the motion sensor 106 in response to sensing some type of motion in an area covered by the motion sensor 106.

The processing device can identify a motion duration sensed by the motion sensor motion based on the sensor output states 302, 304, or 308. The processing device can generate one or more control signals based on the identified duration. The processing device can transmit the control signals to one or more of the luminaire drivers 110a, 110b via the communication interface provided by the communication terminals 128, 130. One or more of the luminaire drivers 110a, 110b can modify the operation of one or more luminaires in response to receiving the control signals. Modifying the operation of a luminaire can result in a luminaire dim-level state corresponding to a detected sensor output state.

In this example, a duration 303 of the sensor output state 302 (i.e., $t_2-t_1$) is less than a minimum occupancy-detection pulse width. The dimming control node 102 can identify a minimum occupancy-detection pulse width, where the minimum occupancy-detection pulse width can be configured to have any suitable value (e.g., two seconds). The dimming control node 102 determines that the sensor output state 302 has a duration 303 that is less than the minimum occupancy-detection pulse width. Based on this determination, processing logic in the dimming control node 102 can output a decision in which no change occurs in the luminaire dim state, as indicated by the luminaire dim-level state remaining low following the sensor output state 302. If this "maintain" decision is made, the dimming control node 102 does not transmit any commands to the luminaire drivers 110a, 110b to modify the luminaire operation.

In another example, the sensor output signal can have a duration that is sufficiently long to trigger synchronization of the sensor output signal and the luminaire dim-level state. For example, the sensor output state 304 has a duration 305 (i.e., $t_4-t_3$) that satisfies a minimum occupancy-detection requirement. The sensor output state 304 continues for a duration 306 (i.e., $t_5-t_4$). The dimming control node 102 can determine that the duration 306 is greater than or equal to a minimum response duration, which can be configured to have any suitable value (e.g., nine seconds). Based on this determination, processing logic in the dimming control node 102 can output a decision in which the luminaire dim state is synchronized with the sensor output signal. For instance, in FIG. 3, the luminaire dim-level state 307 is set to a high dim-level state at time $t_4$ after the minimum occupancy-detection pulse width (i.e., the duration 305) has elapsed. At time $t_5$, the processing logic determines that the dim-level state should be synchronized with the sensor output state based on the minimum response duration (i.e. the duration 306) having elapsed. In accordance with this synchronization, the processing logic causes the dim-level state 307 to be set to a low dim-level state at time $t_6$ concurrently with the sensor output state 304 changing to a low state. If the "synchronization" decision is made, the dimming control node 102 transmits suitable commands (e.g., dimming signals or other control signals) to the luminaire drivers 110a, 110b to modify the luminaire operation and thereby obtain the luminaire dim-level state 307.

In some aspects, the dimming control node 102 is configured to maintain a "high" dim-level state (e.g., lights are set to on and at full illumination) for a specified period of time (e.g., a minimum of 30 seconds) after the most recent detection of occupancy, assuming that the determined duration of occupancy satisfies a minimum response duration, as described above. In other aspects, the dimming control node 102 is configured to maintain a "high" dim-level state (e.g., lights are set to on and at full illumination) for a period of time sufficient to prevent short-cycling (e.g., nine seconds) if the determined duration of occupancy does not satisfy a minimum response duration.

In the example depicted in FIG. 3, the sensor output signal can have a duration that is sufficiently long to trigger a change in the luminaire dim-level state, but insufficiently long to trigger synchronization of the sensor output signal and the luminaire dim-level state. For example, the sensor output state 308 has a duration 309 (i.e., $t_8-t_7$) that satisfies the minimum occupancy-detection pulse width. Processing logic in the dimming control node 102 can determine that the duration 309 satisfies the minimum occupancy-detection pulse width and can output a decision in which the luminaire dim-level state 311 is set to high. The sensor output state 304 continues for a duration 310 (i.e., $t_9-t_8$). The dimming control node 102 can determine that the duration 311 is less than the minimum response duration. Based on this determination, the dimming control node 102 can output a decision to maintain the high dim-level state for a set period of time (e.g., the remainder of the minimum response duration) and then switch the dim-level state to a low state.

For instance, in FIG. 3, the luminaire dim-level state 311 is set to a high dim-level state at time $t_8$ after the minimum occupancy-detection pulse width (i.e., the duration 309) has elapsed. At time $t_9$, the processing logic determines that the dim-level state should be changed based on the minimum response duration elapsing. In accordance with this determination, the processing logic causes the dim-level state 311 to be set to a low dim-level state at time $t_{10}$ based on a minimum response duration 312 (i.e., $t_{10}-t_8$) elapsing without the sensor output returning to a high state. The dimming control node 102 implements these state changes to the dim level by transmitting suitable commands (e.g., dimming signals or other control signals) to the luminaire drivers 110a, 110b to modify the luminaire operation and thereby obtain the luminaire dim-level state 311 at time $t_8$ and a low dim-level state at time $t_{10}$.

In the example depicted in FIG. 3, the dim-level state is switched from a low level to a high level without an intermediate dim level. But other implementations are possible. For example, the dimming control node 102 can use a ramped approach in which the dim-level state gradually increases from a low level to a high level, gradually decreases from a high level to a low level, or both. The dimming control node 102 can be configurable so that any type of ramping (e.g., ramp up only, ramp down only, or ramp up and down) is used or no ramping is used when transitioning between dim-level states.

Figure 4:
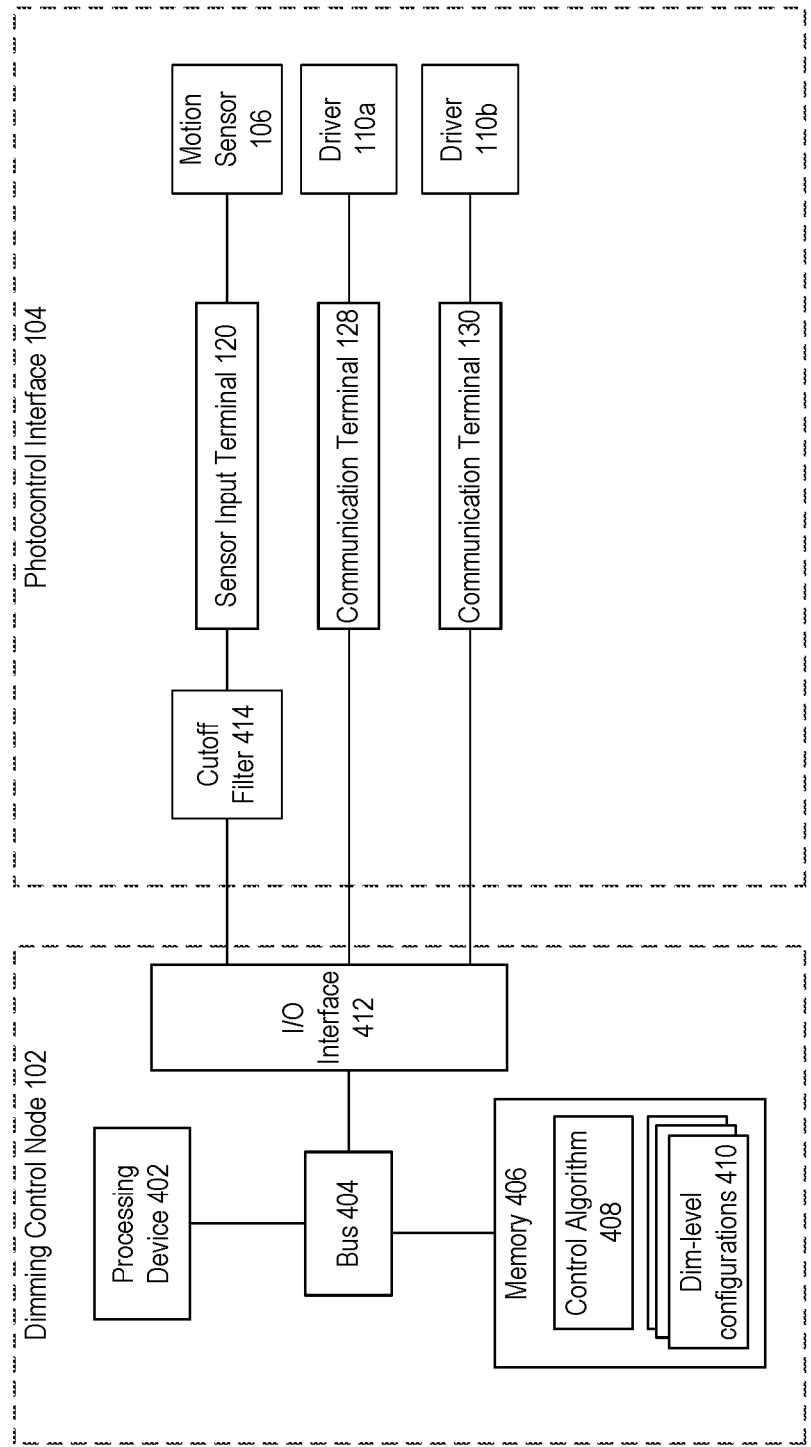
FIG. 4 is a block diagram depicting an example of the dimming control node of FIG. 1, according to some aspects of this disclosure.

The dimming control node 102 can be implemented with suitable computing hardware. For instance, FIG. 4 is a block diagram depicting an example of the dimming control node 102. In this example, the dimming control node 102 includes a processing device 402, a bus 404, a memory device 406 that stores a control algorithm 408 and dim-level configurations 410, and an input/output ("I/O") interface 412.

The processing device 402 can include any suitable device or group of devices configured to execute code (e.g., the control algorithm 408) stored on a computer-readable medium (e.g., the memory device 406). Examples of a processing device 402 include a microprocessor, a mixed signal microcontroller, an application-specific integrated circuit ("ASIC"), a field-programmable gate array ("FPGA"), or another suitable processing device. The processing device 402 can be communicatively coupled to other components of the dimming control node 102 via the bus 404. The bus 404 can include any suitable hardware (e.g., one or more traces of a printed circuit board) for communicating signals among components of the dimming control node 102.

The memory device 406 can store the control algorithm 408 and one or more dim-level configurations 410. The memory device 406 can include any suitable non-volatile memory device. An example of the memory device 406 is an electrically erasable programmable read-only memory ("EEPROM") device.

The dimming control node 102 can be communicatively coupled to the photocontrol interface 104 via the I/O interface 412. The I/O interface 412 can include, for example, pins of a processing device 402 or other terminals that can form an electrical connection with corresponding terminals of the photocontrol interface 104. As depicted in FIG. 4, the I/O interface 412 can be connected to the sensor input terminal 120 and the communication terminals 128, 130 via the I/O interface 412. Examples of an I/O interface 412 include an I/O interface suitable for communicating with a photocontrol interface that is compliant with the ANSI 136.10-2010 standard, interfaces described in U.S. Pat. No. 9,148,936 to Wagner et al., etc. For simplicity of illustration, FIG. 4 omits other connections between the dimming control node 102 and the photocontrol interface 104, such as the various connections for providing electrical power (e.g., connections with the neutral terminal 124 and line terminals 122, 126, etc.).

In some aspects, a cut-off hardware filter 414 may be included in the photocontrol interface 104 (as depicted in FIG. 4) or in the dimming control node 102. The filter can prevent sensor data indicating a motion duration (i.e., sensor output duration) less than a minimum occupancy-detection threshold from being provided to the processing device 402. For example, the cut-off hardware filter (e.g., a 10 KHz filter) can filter electric noise or other "nuisance" inputs (e.g., a sensor output state of that is less than a minimum output duration). In some aspects, the inclusion of a cut-off hardware filter can obviate the need for a dim-level configuration 410 corresponding to the sensor output state 302 of FIG. 3. In additional or alternative aspects, the inclusion of a cut-off hardware filter can be used in combination with a dim-level configuration 410 corresponding to the sensor output state 302 of FIG. 3.

The processing device 402 can receive electrical signals from the photocontrol interface 104 via the I/O interface 412, such as signals from the motion sensor 106 that are received via the sensor input terminal 120. The processing device 402 can execute the control algorithm 408 to determine a sensor output state based on the received electrical signals. Executing the control algorithm 408 can cause the processing device 402 to select one or more of the dim-level configurations 410 and to implement the selected dim-level configuration state. Implementing the selected dim-level configuration state can involve communications with one or more of the luminaire drivers 110*a*, 110*b* via the communication terminals 128, 130.

Figure 5:
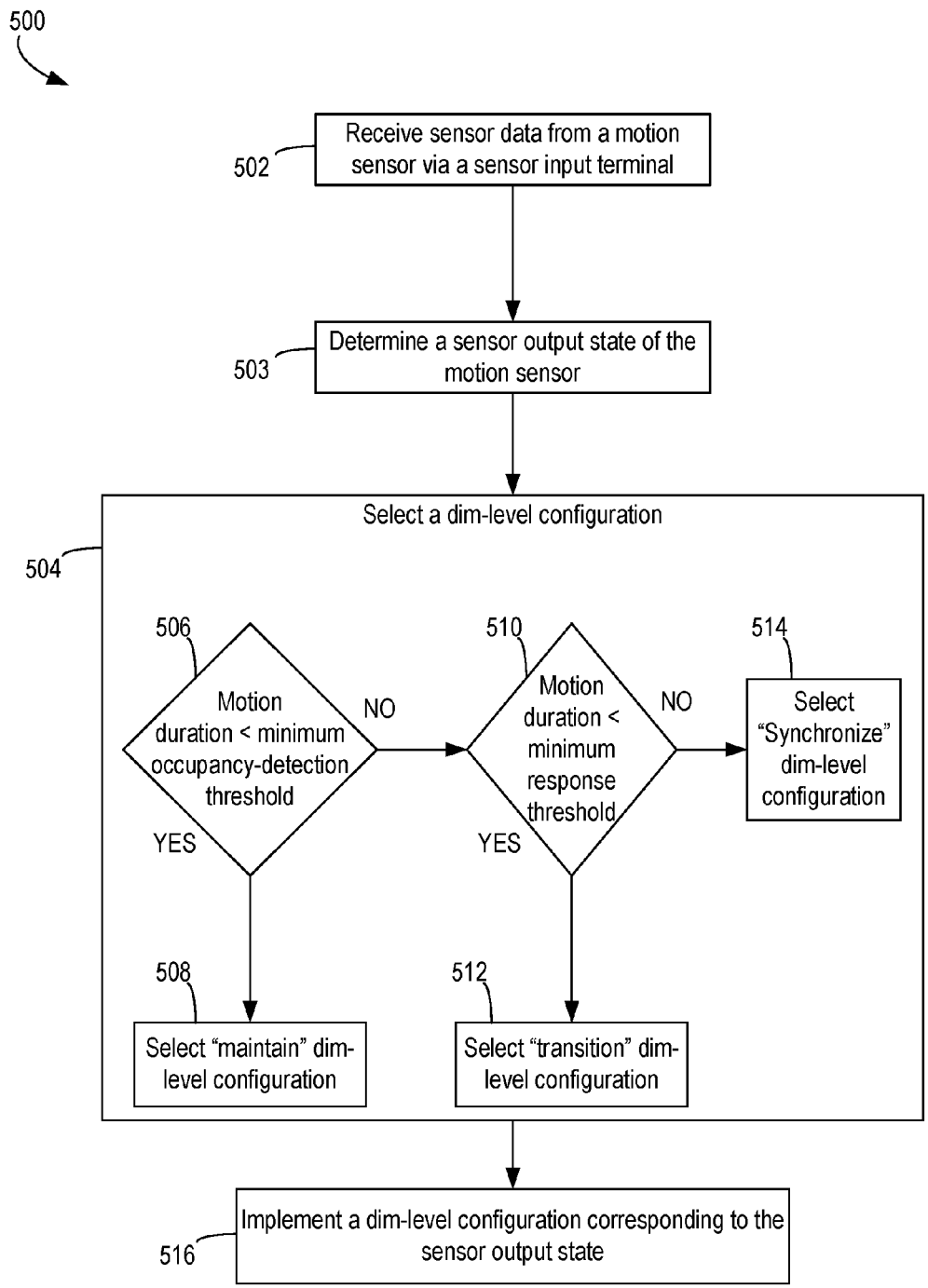
FIG. 5 is a flow chart depicting an example of a process for controlling an outdoor lighting system with a control node coupled to a motion sensor via a photocontrol interface, according to some aspects of this disclosure.

For instance, FIG. 5 is a flow chart depicting an example of a process 500 for using the dimming control node 102 and the photocontrol interface 104 to control operation of a luminaire driver or ballast based on communications with a motion sensor 106. The process 500 is described with respect to the examples depicted in FIGS. 1-4 and otherwise described herein. However, other implementations are possible.

At block 502, the processing device 402 can receive sensor data from a motion sensor via a sensor input terminal. For example, the photocontrol interface 104 can receive one or more signals from the motion sensor 106. The signals can include sensor data indicating motion that has been detected by the motion sensor 106.

At block 503, the processing device 402 can determine a sensor output state of the motion sensor. For instance, the processing device 402 can determine or otherwise identify a motion duration indicated by the sensor data received at block 502. In some aspects, the sensor output state can be a waveform having one of the durations depicted in FIG. 3 or other suitable durations.

In one example, the dimming control node 102 polls the status of the sensor input terminal 120. The polling can be performed periodically (e.g., once per 100 milliseconds). The processing device 402 can shift the polled status into a 16-bit rolling status register in the memory device 406. The processing device 402 can test the number of "1" values in the 16-bit rolling status register. If the 16-bit rolling status register value is greater than a threshold (e.g., more than twelve) and the current occupancy status (e.g., an "OCC" flag") has a status of "FALSE," the processing device can change the occupancy status to "TRUE." If the 16-bit rolling status register value is less than a threshold (e.g., less than four) and the current occupancy status has a status of "TRUE," the processing device can change the occupancy status to "false." If the occupancy status changes from "FALSE" to "TRUE," the processing device can start a timer, which is set to expire in accordance with the minimum-occupancy detection pulse width or other minimum-occupancy threshold. On expiration of the timer, if the occupancy status has not changed back to "FALSE," then a dim-level state change can be implemented so that a specified dim level (e.g., an "occupied dim level" stored in the memory device 406 as a node profile) is obtained.

At block 504, the processing device 402 can select one or more of the dim-level configurations 410. A dim-level configuration 410 can be selected based on the sensor output state.

For instance, at block 506, the processing device 402 can determine whether a motion duration indicated by the sensor data is less than a minimum-occupancy detection threshold. The minimum-occupancy detection threshold (e.g., the minimum-occupancy pulse width depicted in FIG. 3) can be stored in the memory device 406. The processing device 402 can retrieve the minimum-occupancy detection threshold from the memory device 406 and compare the retrieved minimum-occupancy detection threshold with the motion duration determined at block 503.

If the motion duration indicated by the sensor data is less than the minimum-occupancy detection threshold, the processing device 402 can select a "maintain" dim-level configuration, as depicted at block 508. In some aspects, the "maintain" dim-level configuration can involve the processing device 402 maintaining a current dim-level state of a luminaire due to the absence of sufficient motion activity in the area serviced by the motion sensor 106.

If the motion duration indicated by the sensor data is greater than or equal to the minimum-occupancy detection threshold, the process 500 can proceed to block 510. At block 510, the processing device 402 can determine whether the motion duration indicated by the sensor data is less than a minimum response threshold. The minimum response threshold (e.g., the minimum response duration in FIG. 3) can be stored in the memory device 406. The processing device 402 can retrieve the minimum response threshold from the memory device 406 and compare the retrieved minimum response threshold with the motion duration determined at block 503.

If the motion duration indicated by the sensor data is less than a minimum response threshold, the process 500 can proceed to block 512. At block 512, the processing device 402 can select a "transition" dim-level configuration. In some aspects, the "transition" dim-level configuration can involve the processing device 402 maintaining a current dim-level state of a luminaire (e.g., an "on" or "high illumination" state) for a specified period (e.g., the length of the minimum response duration) due to the motion activity satisfying the minimum occupancy-detection threshold. The "transition" dim-level configuration can also involve subsequently switching the dim-level state to a low dim-level state (e.g., an "off" or "low light" state) due to the motion activity failing to satisfy the minimum response threshold.

If the motion duration indicated by the sensor data is greater than or equal to a minimum response threshold, the process 500 can proceed to block 514. At block 514, the processing device 402 can select a "synchronize" dim-level configuration. In some aspects, the "synchronize" dim-level configuration can involve the processing device 402 matching a current dim-level state of a luminaire to a sensor state of the output sensor. For example, as depicted in FIG. 3, a luminaire can be switched to a high dim-level state (e.g., an "on" or "high illumination" state) and can be maintained at the high dim-level state if the sensor output state indicates motion activity. The "synchronize" dim-level configuration can also involve subsequently switching the dim-level state to a low dim-level state (e.g., an "off" or "low light" state) if the sensor output state subsequently indicates a lack of motion activity.

At block 516, the processing device 402 can implement the selected dim-level configuration that corresponds to the sensor output state. For example, maintaining the current dim-level state of a luminaire can include deciding, by the processing device 402, that no control signals should be sent to a driver or ballast that would cause a luminaire to switch from a low dim-level state (e.g., an "off" or "low light" state) to a high dim-level state (e.g., an "on" or "high illumination" state). Furthermore, transitioning the current dim-level state of a luminaire can include deciding, by the processing device 402, that one or more control signals should be sent to a driver or ballast that would cause a luminaire to switch from a high dim-level state to a low dim-level state. Furthermore, synchronizing the current dim-level state of a luminaire can include deciding, by the processing device 402, that one or more control signals should be sent to a driver or ballast that would cause a luminaire to switch from a high dim-level state to a low dim-level state if the sensor output state switches from a sensor state indicating the presence of motion activity to a sensor state indicating the absence of motion activity.

For dim-level configurations requiring changes in the dim-level state, the processing device 402 can implement block 516 by generating one or more control signals. The processing device 402 can cause the dimming control node 102 to transmit the control signals to a suitable driver or ballast via one or more of the communication terminals 128, 130. The control signals can cause the luminaire driver or ballast to increase or decrease the output illumination of a luminaire to correspond to the desired dim-level state.

For example, if a "minimum response" duration timer expires, the processing device 402 can check an occupancy status. If the occupancy status has transitioned to "FALSE" during a time period corresponding to the "minimum response" duration timer, the dimming control node 102 can revert the dim level to a previous level, subject to a schedule command or queued commands. If the minimum response timer expires and the occupancy status is still "TRUE," the processing device 402 can reset the minimum response timer and iterate until the occupancy status transitions to "FALSE."

The system depicted in FIGS. 1 and 4 can be implemented in any suitable manner. In one example of an implementation, the depicted system can integrate a power DC power supply of a motion sensor. Such a power supply can exhibit a nominal voltage of 15.0 Vdc+/−2.0 Vdc. The power supply can source at least 10 mA (e.g., accommodate 4 mA consumed by the sensor and 6 mA of sink/source current used to provide a sensor output signal to the sensor input terminal). The power supply can be limited to source no more than 100 mA. The power supply can incorporate short circuit and over-voltage protection. The power supply can incorporate a shutdown mechanism to disable any connected sensor device completely. The sensor power supply can be referenced to a sensor input terminal 120 (e.g., an ANSI C136.41 terminal 4, which maps to the grey receptacle lead), where the conductor is shared between the luminaire driver dimming circuit and the sensor power circuit.

Continuing with an example involving an ANSI C136.41-compliant photocontrol interface 104, the sensor power (and DC rail) and input terminals can be supported via ANSI C136.41 terminals 6 and 7 which map to the brown and orange leads. The sensor terminals can be galvanically isolated from mains (high voltage). The sensor terminals can be inherently power limited per UL definition (e.g., under UL916). The sensor terminals can withstand dielectric withstand (hipot) at 3,000 Vac to mains (high voltage terminals) with no more than 0.5 mA of leakage. The sensor terminals can be plated according to ANSI C136.41 requirements to provide adequate low-voltage contact resistance and inhibit fretting corrosion and metal migration over time.

Continuing with an example involving an ANSI C136.41-compliant photocontrol interface 104, the sensor input terminal 120 may accept an input voltage range of 0 V to 30 Vdc. The sensor input terminal 120 may interpret an applied voltage 10 Vdc<Vin<30 Vdc as a logic high state. The sensor input terminal 120 may interpret an applied voltage Vin<10 Vdc as a logic low state. The sensor input terminal 120 may incorporate negative and over-voltage protection. The sensor input terminal 120 may limit input sink current in a logical "high" state to 4 mA. The sensor input terminal 120 may limit leakage source current in a logical "low state" to 25 µA.

In some aspects, the dimming control node 102 can use a node profile stored in the memory device 406 for a particular lighting system in a particular environment. The node profile can include one or more configurable parameters (e.g., ramping used in state transitions, length of minimum occupancy threshold, length of minimum response threshold, etc.). The node profile can also include one or more parameters such as, for example, a polarity setting (e.g., "0" or "1") for the sensor input terminal 120 regarding signals received from the motion sensor 106, an "enable" parameter for activating or deactivating the sensor or enabling/disabling use of the sensor input terminal 120 by the dimming control node, a specified dim level (e.g., 0-100) for each dim-level state, a parameter indicating the presence or absence of the motion sensor 106, etc.

The foregoing description, including illustrated examples, has been presented only for the purpose of illustration and description and is not intended to be exhaustive or to limit the invention to the precise forms disclosed. Numerous modifications, adaptations, and uses thereof will be apparent to those skilled in the art without departing from the scope of this disclosure. Aspects and features from each example disclosed can be combined with any other example.

The invention claimed is:
1. A dimming control node comprising:
 a photocontrol interface comprising:
  a sensor power terminal that is electrically couplable to a motion sensor and configured for providing power to the motion sensor via a first wired connection to the motion sensor, a sensor input terminal that is communicatively couplable to the motion sensor and configured for receiving sensor data via a second wired connection to the motion sensor, and a communication terminal that is communicatively couplable to a luminaire ballast or luminaire driver; and a processing device communicatively coupled to the sensor input terminal and the communication terminal, wherein the processing device is configured for:

determining a sensor output state of the motion sensor from the sensor data received via the first wired connection, selecting a dim-level configuration corresponding to the sensor output state of the motion sensor, and causing the dimming control node to transmit, via the second wired connection, a control signal to the luminaire ballast or luminaire driver, the control signal configured for setting the luminaire ballast or luminaire driver to the selected dim-level configuration.

2. The dimming control node of claim 1, wherein the processing device is further configured for:

determining, from the sensor data, that the sensor output state indicates a motion duration greater than or equal to a minimum occupancy-detection pulse width and less than a minimum response duration, wherein the dim-level configuration comprises:
 (i) the luminaire ballast or luminaire driver being set to a high dim-level state based on the motion duration being greater than or equal to the minimum occupancy-detection pulse width, and
 (ii) the luminaire ballast or luminaire driver being set to a low dim-level state after the minimum response duration has elapsed and based on the motion duration being less than the minimum response duration; and generating the control signal for setting the luminaire ballast or luminaire driver to the high dim-level state in accordance with selected the dim-level configuration and for setting the luminaire ballast or luminaire driver to the low dim-level state in accordance with the selected dim-level configuration.

3. The dimming control node of claim 1, wherein the processing device is further configured for:

determining, from the sensor data, that the sensor output state indicates a motion duration that is (i) greater than or equal to a minimum occupancy-detection pulse width and (ii) greater than or equal to a minimum response duration, wherein the dim-level configuration comprises:
 (i) the luminaire ballast or luminaire driver being set to a high dim-level state based on the motion duration being greater than or equal to the minimum occupancy-detection pulse width, and
 (ii) a subsequent dim-level state of the luminaire ballast or luminaire driver being synchronized with a subsequent sensor output state based on the motion duration being greater than or equal to the minimum response duration; and generating the control signal for setting the luminaire ballast or luminaire driver to the high dim-level state in accordance with selected the dim-level configuration and for synchronizing the subsequent dim-level state of the luminaire ballast or luminaire driver to the sensor output state in accordance with the selected dim-level configuration.

4. The dimming control node of claim 1, wherein the processing device is further configured for:

receiving, via the sensor input terminal, additional sensor data;

determining, from the additional sensor data, that an additional sensor output state has a duration less than a minimum occupancy-detection pulse width; and maintaining, based the duration being less than the minimum occupancy-detection pulse width, a low dim-level state of the luminaire ballast or luminaire driver.

5. The dimming control node of claim 1, wherein the dim-level configuration comprises:
 (i) the luminaire ballast or luminaire driver being set to a high dim-level state based on a motion duration, as indicated by the sensor output state, being greater than or equal to a minimum occupancy-detection pulse width, and
 (ii) the luminaire ballast or luminaire driver being set to a low dim-level state after a minimum response duration has elapsed and based on the motion duration being less than the minimum response duration, wherein the processing device is further configured for:

determining an additional sensor output state of the motion sensor from additional sensor data received via the first wired connection, selecting an additional dim-level configuration corresponding to the additional sensor output state, wherein the additional dim-level configuration comprises:
 (i) the luminaire ballast or luminaire driver being set to a high dim-level state based on an additional motion duration, as indicated by the additional sensor output state, being greater than or equal to the minimum occupancy-detection pulse width, and
 (ii) a subsequent dim-level state of the luminaire ballast or luminaire driver being synchronized with a subsequent sensor output state based on the additional motion duration being greater than or equal to the minimum response duration; and and causing the dimming control node to transmit, via the second wired connection, an additional control signal to the luminaire ballast or luminaire driver, the additional control signal configured for setting the luminaire ballast or luminaire driver to the selected additional dim-level configuration.

6. The dimming control node of claim 1, further comprising a hardware filter configured to prevent additional sensor data, which indicates a sensor output duration less than a minimum occupancy-detection pulse width, from being provided to the processing device.

7. The dimming control node of claim 1, wherein the photocontrol interface further comprises a sensor power terminal, a line terminal, a low-voltage common terminal, and a neutral terminal, wherein the sensor power terminal and the low-voltage common terminal are configured to form a first electrical connection providing power to the motion sensor, wherein the line terminal and the neutral terminal are configured to form a second electrical connection providing power to the luminaire ballast or luminaire driver.

8. A method comprising:

providing, by a dimming control node, power to a motion sensor via a first wired connection to a sensor power terminal of a photocontrol interface;

receiving, by the dimming control node, sensor data from the motion sensor via a second wired connection to a sensor input terminal of the photocontrol interface;

determining, by the dimming control node, a sensor output state of the motion sensor from the sensor data received via the first wired connection;

selecting, by the dimming control node, a dim-level configuration corresponding to the sensor output state of the motion sensor; and configuring, by the dimming control node, a luminaire ballast or luminaire driver with the selected dim-level configuration.

9. The method of claim 8, further comprising:

determining, by the dimming control node and from the sensor data, that the sensor output state indicates a motion duration greater than or equal to a minimum occupancy-detection pulse width and less than a minimum response duration, wherein the dim-level configuration comprises:

(i) the luminaire ballast or luminaire driver being set to a high dim-level state based on the motion duration being greater than or equal to the minimum occupancy-detection pulse width, and (ii) the luminaire ballast or luminaire driver being set to a low dim-level state after the minimum response duration has elapsed and based on the motion duration being less than the minimum response duration;

generating, by the dimming control node, a control signal for setting the luminaire ballast or luminaire driver to the high dim-level state in accordance with selected the dim-level configuration and for setting the luminaire ballast or luminaire driver to the low dim-level state in accordance with the selected dim-level configuration; and transmitting the control signal from the dimming control to the luminaire ballast or luminaire driver.

10. The method of claim 8, further comprising:

determining, by the dimming control node and from the sensor data, that the sensor output state indicates a motion duration that is (i) greater than or equal to a minimum occupancy-detection pulse width and (ii) greater than or equal to a minimum response duration, wherein the dim-level configuration comprises:

(i) the luminaire ballast or luminaire driver being set to a high dim-level state based on the motion duration being greater than or equal to the minimum occupancy-detection pulse width, and (ii) a subsequent dim-level state of the luminaire ballast or luminaire driver being synchronized with a subsequent sensor output state based on the motion duration being greater than or equal to the minimum response duration;

generating, by the dimming control node, a control signal for setting the luminaire ballast or luminaire driver to the high dim-level state in accordance with selected the dim-level configuration and for synchronizing the subsequent dim-level state of the luminaire ballast or luminaire driver to the sensor output state in accordance with the selected dim-level configuration; and transmitting the control signal from the dimming control to the luminaire ballast or luminaire driver.

11. The method of claim 8, further comprising:

receiving, by the dimming control node, additional sensor data via the sensor input terminal;

determining, by the dimming control node and from the additional sensor data, that an additional sensor output state has a duration less than a minimum occupancy-detection pulse width; and maintaining, by the dimming control node, a low dim-level state of the luminaire ballast or luminaire driver based the duration being less than the minimum occupancy-detection pulse width.

12. The method of claim 8, wherein the dim-level configuration comprises:

(i) the luminaire ballast or luminaire driver being set to a high dim-level state based on a motion duration, as indicated by the sensor output state, being greater than or equal to a minimum occupancy-detection pulse width, and (ii) the luminaire ballast or luminaire driver being set to a low dim-level state after a minimum response duration has elapsed and based on the motion duration being less than the minimum response duration, wherein the method further comprises:

determining, by the dimming control node, an additional sensor output state of the motion sensor from additional sensor data received via the first wired connection, selecting, by the dimming control node, an additional dim-level configuration corresponding to the additional sensor output state, wherein the additional dim-level configuration comprises:

(i) the luminaire ballast or luminaire driver being set to a high dim-level state based on an additional motion duration, as indicated by the additional sensor output state, being greater than or equal to the minimum occupancy-detection pulse width, and (ii) a subsequent dim-level state of the luminaire ballast or luminaire driver being synchronized with a subsequent sensor output state based on the additional motion duration being greater than or equal to the minimum response duration; and and transmitting, by the dimming control node and via the second wired connection, an additional control signal to the luminaire ballast or luminaire driver that sets the luminaire ballast or luminaire driver to the selected additional dim-level configuration.

13. The method of claim 8, further comprising preventing, with a hardware filter, additional sensor data, which indicates a sensor output duration less than a minimum occupancy-detection pulse width, from being provided to a processing device of the dimming control node.

14. The method of claim 8, wherein the photocontrol interface further comprises a sensor power terminal, a line terminal, a low-voltage common terminal, and a neutral terminal, wherein the sensor power terminal and the low-voltage common terminal form a first electrical connection providing power to the motion sensor, wherein the line terminal and the neutral terminal form a second electrical connection providing power to the luminaire ballast or luminaire driver.

* * * * *